(12) United States Patent
Moran et al.

(10) Patent No.: US 12,118,101 B2
(45) Date of Patent: Oct. 15, 2024

(54) TECHNIQUE FOR PROVIDING A TRUSTED EXECUTION ENVIRONMENT

(71) Applicant: Arm Limited, Cambridge (GB)

(72) Inventors: Brendan James Moran, Histon (GB); Adrian Laurence Shaw, Cambridge (GB); Andreas Lars Sandberg, Cambridge (GB)

(73) Assignee: Arm Limited, Cambridge (GB)

( * ) Notice: Subject to any disclaimer, the term of this patent is extended or adjusted under 35 U.S.C. 154(b) by 233 days.

(21) Appl. No.: 17/903,267

(22) Filed: Sep. 6, 2022

(65) Prior Publication Data

US 2024/0078326 A1 Mar. 7, 2024

(51) Int. Cl.
*G06F 21/60* (2013.01)
*G06F 21/53* (2013.01)

(52) U.S. Cl.
CPC ............ *G06F 21/604* (2013.01); *G06F 21/53* (2013.01)

(58) Field of Classification Search
CPC ............................... G06F 21/604; G06F 21/53
See application file for complete search history.

(56) References Cited

U.S. PATENT DOCUMENTS

| | | | |
|---|---|---|---|
| 2010/0031325 A1* | 2/2010 | Maigne ................... | G06F 21/53 718/1 |
| 2014/0250540 A1* | 9/2014 | Balasubramanian ... | G06F 21/44 726/29 |
| 2016/0371487 A1* | 12/2016 | Poornachandran ... | G06F 21/575 |
| 2020/0249983 A1* | 8/2020 | Wang ................... | G06F 9/45558 |
| 2022/0222337 A1* | 7/2022 | Doshi ..................... | G06F 21/53 |
| 2022/0245244 A1* | 8/2022 | Stoppa ................ | G06F 13/4068 |
| 2023/0050729 A1* | 2/2023 | Peeters ................. | G06F 21/629 |

\* cited by examiner

*Primary Examiner* — Michael Won
(74) *Attorney, Agent, or Firm* — NIXON & VANDERHYE P.C.

(57) ABSTRACT

An apparatus and method are described for providing a trusted execution environment. The apparatus comprises processing circuitry to execute program code, and interrupt controller circuitry, responsive to receipt of one or more interrupt requests, to select a given interrupt request from amongst the one or more interrupt requests, and to issue an interrupt signal to the processing circuitry identifying a given interrupt service routine providing program code to be executed by the processing circuitry to service the given interrupt request. The interrupt controller circuitry is responsive to the given interrupt request being a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry. The interrupt controller circuitry comprises code protection circuitry to inhibit unauthorised modification of the TEE interrupt service routine, and data protection circuitry to inhibit unauthorised access to confidential data processed by the TEE interrupt service routine.

23 Claims, 9 Drawing Sheets

TECHNIQUE FOR PROVIDING A TRUSTED EXECUTION ENVIRONMENT

BACKGROUND

The present technique relates to the field of data processing, and more particularly to the provision of a trusted execution environment within an apparatus.

In modern data processing systems, techniques may be deployed to seek to provide a trusted execution environment. The main aim of a trusted execution environment is to operate on confidential data and guarantee that that data is safe from tampering by a non-trusted entity (for example a non-trusted execution environment provided within the same apparatus).

One known technique for providing a trusted execution environment is to provide a hardware-based mechanism that can provide a "secure world" for running trusted code, the secure world hosting the trusted execution environment, and a "normal world" for running general code, with hardware access control mechanisms used to separate the secure world from the normal world. An example of one such hardware-based mechanism for providing a trusted execution environment is the TrustZone technology developed by Arm Limited, Cambridge, United Kingdom.

However, such a hardware-based approach, whilst providing strong security, is relatively complex, and in some implementations the cost and complexity associated with such an approach may be prohibitive.

Accordingly, it would be desirable to provide a less complex mechanism for seeking to provide a trusted execution environment, that can for example be run on an apparatus that does not provide the hardware mechanisms for providing separate secure and normal worlds within the apparatus.

SUMMARY

In one example arrangement, there is provided an apparatus comprising: processing circuitry to execute program code; and interrupt controller circuitry, responsive to receipt of one or more interrupt requests, to select a given interrupt request from amongst the one or more interrupt requests, and to issue an interrupt signal to the processing circuitry identifying a given interrupt service routine providing program code to be executed by the processing circuitry to service the given interrupt request; wherein: the interrupt controller circuitry is responsive to the given interrupt request being a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry; the interrupt controller circuitry comprises code protection circuitry to inhibit unauthorised modification of the TEE interrupt service routine; and the interrupt controller circuitry further comprises data protection circuitry to inhibit unauthorised access to confidential data processed by the TEE interrupt service routine.

In another example arrangement, there is provided a method of providing a trusted execution environment within an apparatus comprising: employing processing circuitry to execute program code; and arranging interrupt controller circuitry to be responsive to receipt of one or more interrupt requests to select a given interrupt request from amongst the one or more interrupt requests, and to issue an interrupt signal to the processing circuitry identifying a given interrupt service routine providing program code to be executed by the processing circuitry to service the given interrupt request; causing the interrupt controller circuitry, when the given interrupt request is a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry; providing the interrupt controller circuitry with code protection circuitry to inhibit unauthorised modification of the TEE interrupt service routine; and providing the interrupt controller circuitry with data protection circuitry to inhibit unauthorised access to confidential data processed by the TEE interrupt service routine.

In a still further example arrangement, there is provided a computer-readable medium to store computer-readable code for fabrication of an apparatus comprising: processing circuitry to execute program code; and interrupt controller circuitry, responsive to receipt of one or more interrupt requests, to select a given interrupt request from amongst the one or more interrupt requests, and to issue an interrupt signal to the processing circuitry identifying a given interrupt service routine providing program code to be executed by the processing circuitry to service the given interrupt request; wherein: the interrupt controller circuitry is responsive to the given interrupt request being a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry; the interrupt controller circuitry comprises code protection circuitry to inhibit unauthorised modification of the TEE interrupt service routine; and the interrupt controller circuitry further comprises data protection circuitry to inhibit unauthorised access to confidential data processed by the TEE interrupt service routine. The computer readable medium may comprise a transitory computer-readable medium (such as wired or wireless transmission of code over a network), or a non-transitory computer readable medium such as semiconductor, magnetic disk, optical disc, etc.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
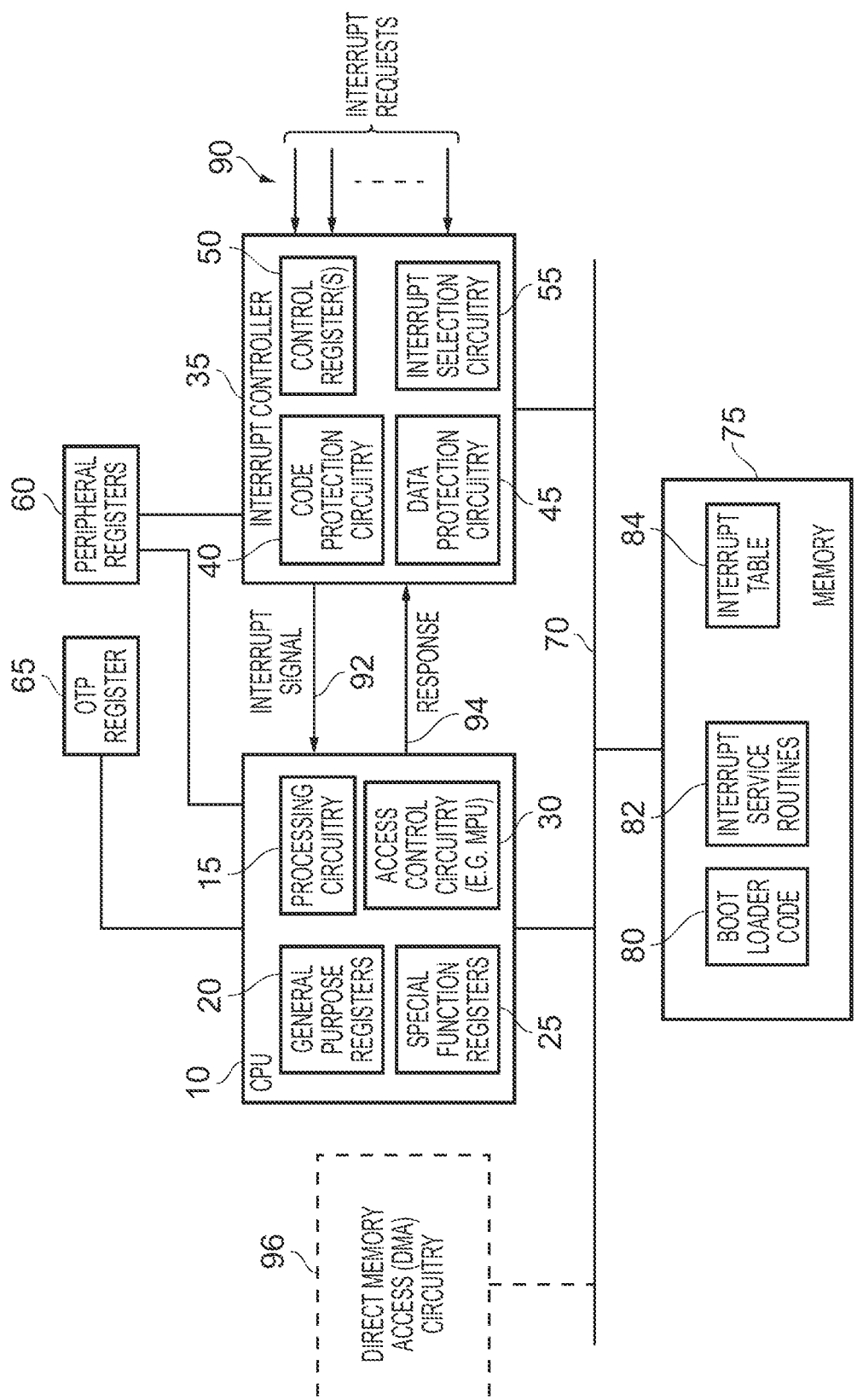
FIG. 1 is a block diagram of a system in accordance with one example implementation.

In one example implementation, an apparatus is provided that has processing circuitry for executing program code, and interrupt controller circuitry, responsive to receipt of one or more interrupt requests, to select a given interrupt request from amongst the one or more interrupt requests, and to issue an interrupt signal to the processing circuitry identifying a given interrupt service routine providing program code to be executed by the processing circuitry to service the given interrupt request.

In accordance with the techniques described herein, a trusted execution environment (TEE) interrupt service routine is provided that can be used to implement a simple trusted execution environment. The interrupt controller circuitry is then arranged to be responsive to the given interrupt request being a TEE interrupt request, to issue the interrupt signal to identify as the given interrupt service routine the TEE interrupt service routine, and to inhibit issuance of any further interrupt signal until the TEE interrupt service routine has been executed by the processing circuitry. Further, the interrupt controller circuitry comprises code protection circuitry to inhibit unauthorised modification of the TEE interrupt service routine, and data protection circuitry to inhibit unauthorised access to confidential data processed by the TEE interrupt service routine.

By arranging for a TEE interrupt service routine to implement a trusted execution environment, and then inhibiting issuance of any further interrupt signals until the TEE interrupt service routine has been executed, this can ensure that the interrupt service routine used to implement the trusted execution environment is non-interruptible. As a result, this prevents tampering with the trusted execution environment since the trusted execution environment is handled by executing the TEE interrupt service routine in exception context, and is prevented from interruption by other code (since for example any other interrupt requests will not be serviced until the TEE interrupt service routine has been executed by the processing circuitry). Further, through use of the code protection circuitry, it can be ensured that the TEE interrupt service routine cannot be modified in any unauthorised way, hence ensuring that the code forming the TEE interrupt service routine is authentic. Further, through use of the data protection circuitry, the confidential nature of the data being processed by the TEE interrupt service routine can be preserved by preventing unauthorised access to such confidential data.

It has been found that such an approach can provide a simple, low-cost and effective mechanism for implementing a trusted execution environment, which can be useful in a variety of situations, for example in low cost systems where the cost and complexity associated with providing the earlier-mentioned hardware-based separation techniques to support a trusted execution environment is prohibitive.

There are various ways in which the interrupt controller circuitry may be arranged to inhibit issuance of any further interrupt signal until the TEE interrupt service routine has been executed by the processing circuitry. However, in one example implementation, the interrupt controller circuitry is arranged to employ a prioritization scheme to select the given interrupt request from amongst the one or more received interrupt requests, and the TEE interrupt request is arranged to have a higher priority than any other interrupt request receivable by the interrupt controller circuitry, to thereby ensure that once an interrupt signal has been issued to the processing circuitry to cause the processing circuitry to execute the TEE interrupt service routine, the interrupt controller circuitry is inhibited from issuing an interrupt signal for any other received interrupt request until the TEE interrupt service routine has been executed by the processing circuitry. This provides a simple and effective mechanism for ensuring that the TEE interrupt service routine is non-interruptible, and hence prevents tampering with the activities of the TEE interrupt service routine.

The code protection circuitry provided by the interrupt controller circuitry to inhibit unauthorised modification of the TEE interrupt service routine can take a variety of forms. In one example implementation, the interrupt controller may be arranged to identify the given interrupt service routine in the interrupt signal by identifying a memory address indication to be used by the processing circuitry to retrieve the given interrupt service routine from memory, and may be arranged to employ a default mechanism to determine the memory address indication for the given interrupt request. However, when the given interrupt request is the TEE interrupt request, the default mechanism may not be used, and instead the code protection circuitry may be arranged to obtain from a locked storage element the memory address indication to be used by the processing circuitry to retrieve the TEE interrupt service routine.

The default mechanism could take a variety of forms. For example, it could take the form of an interrupt table that, for each interrupt request identified in that table, can provide an address indication for determining the memory address used to access the interrupt service routine associated with that interrupt request. It may also capture other information such as priority indication information used to assess the relative priority of the associated interrupt request relative to the priority of other interrupt requests.

The locked storage element can take a variety of different forms. In one example it may take the form of a one-time programmable register that is set to identify the memory address indication to be used by the processing circuitry to retrieve the TEE interrupt service routine. This enables the value in the locked storage element to be set specifically for any given instance of the apparatus.

As another example, the locked storage element could take the form of a lockable register whose value is arranged to be set by early execution code executed by the processing circuitry following a reset of the apparatus, and the lockable register may be arranged to be locked by the early execution code. The location and form of the lockable register may vary dependent on implementation, and hence may for example depend on the architecture being employed within the apparatus. In one particular example case it may take the form of an exception register (which may also be referred to as a control register) provided by the interrupt controller circuitry, this providing ready access to the code protection circuitry of the interrupt controller when determining the memory address indication to be used to retrieve the TEE interrupt service routine. The early execution code could also take a variety of different forms. In general terms it is code that is provided to implement a stage of execution that is entered after a reset of the apparatus, and which is then not re-entered until a further reset takes place. An example of early execution code may be boot loader code, which would be executed at boot time to perform a boot operation, and in that instance the boot loader code may be arranged to set the value in the lockable register and then lock the lockable register prior to exiting the boot operation.

As a still further example, the locked storage element could take the form of a hard-wired storage element providing as the memory address indication an entry point for the TEE interrupt service routine that is provided in unmodifiable memory. The unmodifiable memory could take a variety of forms, and hence for example could take the form of mask ROM (read only memory) or one-time programmable (OTP) ROM. The location in unmodifiable memory of the TEE interrupt service routine may be fixed in some implementations, and the hard-wired the storage element can be used to identify that location (for example by identifying the address of the start of the TEE interrupt service routine). As another alternative, the boot loader program (which will also typically be provided in unmodifiable memory, for example mask ROM) may set up a pointer to the entry point for the TEE interrupt service routine as part of the boot process.

As an alternative mechanism to inhibit unauthorised modification of the TEE interrupt service routine, or as an additional mechanism used in combination with the earlier-discussed mechanism that prevents modification of the memory address indication used to identify the TEE interrupt service routine, the TEE interrupt service routine may be cryptographically signed using an authentication key. In such an implementation, the processing circuitry may then be arranged, in response to the interrupt signal identifying the TEE interrupt service routine, to execute verification code to determine whether the TEE interrupt service routine is verified before allowing the TEE interrupt service routine to be executed. The code protection circuitry may then be arranged to have access to an authenticity verification key and to make the authenticity verification key available to the verification code when determining whether the TEE interrupt service routine is verified. The code protection circuitry can be arranged to control access to the authenticity verification key, so as to only make the authenticity verification key available to the verification code when needed by the verification code to verify the TEE interrupt service routine. The above-mentioned keys can be stored in a secure manner, and in some implementations may be unmodifiable. In other implementations, it may be possible for an authorised entity to change one or both of the keys.

The above-mentioned keys can take a variety of forms, dependent on the technique used. For example, considering a symmetric signature scheme, there are a number of techniques that could be used. As a first example, Authenticated Encryption (optionally with Associated Data) or AEAD could be used. In this case, the authentication key and authenticity verification key can take the form of an encryption key and decryption key, respectively. Then the encryption key may be the same as the decryption key, and take the form of a secret key. In another example implementation Message Authentication Codes or MACs can be used. A common version is HMAC (e.g. FIPS198-1) which uses a secret to compute a keyed digest, producing a "Tag." The verifier also computes a keyed digest and compares the resulting tag with the original tag. In this example implementation, material is not encrypted, nor is it decrypted. Instead it is digested along with a key (the above-mentioned authentication and authenticity verification keys forming these keys).

Considering as another example an asymmetric signature scheme, the above-mentioned keys may for instance take the form of an encryption key and decryption key provided by a pair of keys, one being a private key and one being a public key. In one example implementation, the encryption key is a public key and the decryption key is a private key.

The verification code executed by the processing circuitry to seek to verify the TEE interrupt service routine can be stored in a variety of ways, but in one example is stored in a manner so as to make it untamperable, for example by storing it in unmodifiable memory such as mask ROM.

In one particular example implementation, a symmetric signature scheme is used, and hence the authentication key is the same as the authenticity verification key. Further, the TEE interrupt service routine is arranged to include an authentication code. The processing circuitry is arranged to execute the verification code to generate a comparison authentication code from the decryption key and one or more items of data associated with the TEE interrupt service routine, and to determine that the TEE interrupt service routine is verified when the comparison authentication code matches the authentication code included in the TEE interrupt service routine.

The authentication code can be included within the TEE interrupt service routine in a variety of ways, but in one example implementation is provided in a stub portion of the interrupt service routine, which can also include other information related to the interrupt service routine, such as length information. Further, the one or more items of data associated with the TEE interrupt service routine that are used when generating the comparison authentication code can take a variety of forms, but in one example may include at least an indication of the start address of the TEE interrupt service routine and an indication of the length of the TEE interrupt service routine.

As an alternative to the above verification approach, in some implementations a plain digest comparison technique may be used to seek to verify the TEE interrupt service routine. For instance, a digest may be created from the TEE interrupt service routine, for example using a hash function, and that digest may be stored by the code protection circuitry for use when seeking to verify the TEE interrupt service routine in due course. In this case, the verification code can be arranged to generate a comparison digest from the TEE interrupt service routine as accessed in response to the interrupt signal issued from the interrupt controller circuitry, and then compare that comparison digest with the digest provided by the code protection circuitry of the interrupt controller.

The data protection circuitry provided by the interrupt controller circuitry to inhibit unauthorised access to confidential data processed by the TEE interrupt service routine can take a variety of forms. In one example implementation, the confidential data processed by the TEE interrupt service routine is stored in memory in encrypted form, using an encryption key, unless the processing circuitry is executing the TEE interrupt service routine. Further, the data protection circuitry is arranged to inhibit the processing circuitry from accessing the encryption key, and a decryption key used to decrypt the confidential data, unless the processing circuitry is executing the TEE interrupt service routine. The processing circuitry is then arranged to use the decryption key, whilst executing the TEE interrupt service routine, to decrypt the confidential data to enable the confidential data to be processed during execution of the TEE interrupt service routine, and to use the encryption key to encrypt the confidential data prior to completing execution of the TEE interrupt service routine.

As with the earlier discussion of encryption of the TEE interrupt service routine, the scheme used when encrypting the data may be a symmetric scheme (in which case the encryption key and the decryption key are formed by the same, secret, key) or an asymmetric scheme (where the encryption key and the decryption key are formed from a public key/private key pair).

There are various ways in which access to the encryption key and the decryption key can be controlled by the data protection circuitry. In one example implementation, the encryption key and the decryption key (which as mentioned above could in fact be the same single key in the case of a symmetric scheme being used) are stored in a given storage element whose accessibility is controlled by the interrupt controller circuitry, and the data protection circuitry is arranged to enable the processing circuitry to access the given storage element whilst the processing circuitry is executing the TEE interrupt service routine.

There are various ways in which the data protection circuitry can enable the processing circuitry to access the given storage element whilst the TEE interrupt service routine is being executed. Such access could for example be controlled based on the priority level of an interrupt request associated with the currently asserted interrupt signal, such that only when the highest priority interrupt request, namely the TEE interrupt request, is associated with the interrupt signal that has been issued to the processing circuitry will the processing circuitry be granted access to the given storage element. Access can then subsequently be disabled in a variety of ways, for example on receipt of a signal indicating that execution of the TEE interrupt service routine is complete, or based on an explicit signal from the processing circuitry to disable access that is sent on completion of the TEE interrupt service routine (for example by the processing circuitry writing to a special function register, a peripheral register, or sending a signal to the interrupt controller circuitry).

The given storage element can take a variety of forms. For example, the given storage element may take the form of at least one register external to a processing unit containing the processing circuitry which the processing circuitry is only enabled to access when executing the TEE interrupt service routine. Such a register may be referred to as a peripheral register, and as one specific example may take the form of a register provided by the interrupt controller circuitry.

As another example, the given storage element may take the form of at least one special function register within the processing unit that the processing circuitry is only enabled to access when executing the TEE interrupt service routine. For example, boot loader code may set the value within such a special function register, with access to that special function register then being enabled by the data protection circuitry when the TEE interrupt service routine is being executed by the processing circuitry.

As a still further example, the given storage element may take the form of at least one general purpose register within the processing unit in which the processing unit is enabled, under control of the data protection circuitry, to maintain a copy of the encryption key and the decryption key whilst the processing circuitry is executing the TEE interrupt service routine. For example, a signal from the interrupt controller circuitry may enable the processing circuitry to store a copy of the encryption and decryption keys in one of its general purpose registers, with that copy being taken from the contents of another register, for example a special function register. A suitable mechanism would then need to be provided to ensure that the copy is deleted from the general purpose register(s) when execution of the TEE interrupt service routine completes, for example by including one or more instructions at the tail end of the TEE interrupt service routine to clear the contents of such a general purpose register.

When using the above encryption technique in association with the confidential data to be processed by the TEE interrupt service routine, then it may be possible in some implementations for the decrypted version of the confidential data to potentially be exposed. For instance, whilst it will be apparent from the above discussion that the TEE interrupt service routine can be made uninterruptible by other code, in some implementations a reset of the apparatus could prevent the TEE interrupt service routine from completing, in which case any decrypted confidential data may not have been re-encrypted. In one example implementation, the potential for any such decrypted confidential data to be accessed following the reset can be avoided by arranging for early execution code executed by the processing circuitry following such a reset of the apparatus to be arranged to scrub memory in order to avoid access to the confidential data in unencrypted form in the event execution of the TEE interrupt service routine was interrupted at a time the apparatus was reset. Such early execution code can take a variety of forms, but in one example implementation may be boot loader code executed at boot time to perform a boot operation following a reset of the apparatus. It should be noted that in some implementations the need to scrub memory may be unnecessary, since it may for example depend on the persistence of data in the event of a power loss, within the memory being used to store the decrypted confidential data.

As an alternative to cryptographically protecting the confidential data as discussed above, or as an additional mechanism to provide further protection to the confidential data, access control techniques can be used to limit access to the confidential data, under the control of the data protection circuitry.

For example, the apparatus may further comprise access control circuitry to which any access request seeking to access the confidential data must be routed before allowing the confidential data to be accessed. The access control circuitry may then be controlled by the data protection circuitry to prevent access to the confidential data unless the processing circuitry is executing the TEE interrupt service routine. The access control circuitry can then act as an access control gate to inhibit access to any confidential data by unauthorised requests (i.e. those that do not relate to the execution of the TEE interrupt service routine by the processing circuitry). The location of the access control circuitry may vary dependent on implementation, and for example dependent on the use and location of caches within the system, but by way of example the functionality of the access control circuitry may be implemented by bus arbiter circuitry, memory management unit (MMU) circuitry, memory protection unit (MPU) circuitry, etc.

The memory used by the processing circuitry when executing the TEE interrupt service routine can take a variety of forms. In one example implementation, the memory accessible to the processing circuitry includes private memory, and the data protection circuitry is arranged to only enable the processing circuitry to access the private memory when the processing circuitry is executing the TEE interrupt service routine. Hence, if the processing circuitry is arranged to access the confidential data within such private memory, this can provide an additional level of protection, by preventing that private memory from being accessed unless the TEE interrupt service routine is being executed.

There are various ways in which access to private memory can be inhibited by the data protection circuitry unless the processing circuitry is executing the TEE interrupt service routine. In one example implementation, the apparatus further comprises a plurality of bus arbiters used to arbitrate access to associated blocks of memory, and in a default mode of operation each bus arbiter whose associated block of memory is within the private memory is arranged to assert a fault signal if the processing circuitry seeks to access the associated block of memory. The data protection circuitry can then be arranged to cause each bus arbiter whose associated block of memory is within the private memory to operate in a further mode of operation whilst the processing circuitry is executing the TEE interrupt service routine, in which each bus arbiter whose associated block of memory is within the private memory allows the processing circuitry to access the associated block of memory.

In one example implementation, the bus arbiters can be located in a manner that seeks to prevent their access control function being bypassed. For example, each bus arbiter whose associated block of memory is within the private memory may be arranged to be located relative to the associated block of memory so as to inhibit provision of a bypass path that would enable the associated block of memory to be accessed without routing the access through the bus arbiter. Such an approach could for example be used to inhibit a direct memory access (DMA) bypass in implementations where direct memory access circuitry is provided to perform certain memory accesses on behalf of the processing circuitry, by locating bus arbiters close to their associated block of memory.

In another implementation, it may be determined appropriate to not allow any processing elements (such as a DMA) other than the processing circuitry (e.g. the CPU) to access the private memory at any time. This could for example prevent the possibility of an attacker setting up a DMA transaction that starts in "normal" memory but then progresses into the private memory, and then triggering the TEE exception after the DMA transaction has started to be executed by the DMA in order to seek to gain unauthorised access to the private memory. In particular, if the processing circuitry is still executing the TEE ISR at the time the DMA attempts to access the private memory, the above approach could potentially allow the attacker to bypass the protection afforded by the TEE (if for example the bus arbiters allow access by any processing element whilst the TEE ISR is being executed). However, by preventing the DMA from having access to the private memory at any time, or pausing DMA operation whilst the TEE ISR is being executed, this can prevent such an attack.

Furthermore, if desired, in implementations where DMA circuitry is provided that the processing circuitry can utilise to perform chosen memory accesses on behalf of the processing circuitry, the data protection circuitry may be arranged to cause use of the direct memory access circuitry to be disabled whilst the processing circuitry is executing the TEE interrupt service routine. Such an approach can hence provide further protection against bypassing of the data protection measures.

As an alternative to causing the data protection circuitry to directly communicate with the various bus arbiters to vary their mode of operation as discussed earlier, in an alternative implementation the data protection circuitry may be arranged to control access to a private memory enable register so as to only enable access to the private memory enable register whilst the processing circuitry is executing the TEE interrupt service routine. Access to the private memory enable register can then be arranged to cause the private memory to be made accessible to the processing circuitry. This may in some implementations provide a less complex arrangement, since the data protection circuitry can be arranged merely to enable or disable access to the private memory enable register as required. When the private memory enable register is accessible, in one example implementation this may cause an enable signal to be sent to the bus arbiters associated with blocks of memory within the private memory, or alternatively may drive local enable signals to the various memory blocks associated with private memory to directly enable those blocks of memory.

As an alternative to the use of private memory to protect confidential data, or as an additional mechanism used in combination with private memory, the memory accessible to the processing circuitry may include a memory slice that the data protection circuitry is arranged to only enable the processing circuitry to access when the processing circuitry is executing the TEE interrupt service routine.

There are various ways in which the memory slice may be managed to ensure that inadvertent access to decrypted confidential data cannot occur, for example in the event of the earlier-mentioned reset of the apparatus partway through executing the TEE interrupt service routine. For example, the TEE interrupt service routine may be allowed to configure its own memory slice, with bootloader code then being arranged to scrub such a memory slice following a reset, or alternatively the bootloader code may configure the memory slice available to the TEE interrupt service routine.

There are various ways in which access to a memory slice may be controlled by the interrupt controller circuitry. In one example implementation, the apparatus further comprises a memory slice defining storage element whose accessibility is controlled by the interrupt controller circuitry, and the data protection circuitry is arranged to enable the processing circuitry to access the memory slice defining storage element whilst the processing circuitry is executing the TEE interrupt service routine in order to enable the processing circuitry to access the memory slice.

Such a memory slice defining storage element can take a variety of forms. For example, it may take the form of a register external to a processing unit containing the processing circuitry (also referred to herein as a peripheral register), which the processing circuitry is only enabled to access when executing the TEE interrupt service routine. Alternatively, it may take the form of a special function register within the processing unit, that the processing circuitry is only enabled to access when executing the TEE interrupt service routine. As yet another example, it may take the form of a lockable configuration register that the processing circuitry is only enabled to access when executing the TEE interrupt service routine. Such a lockable configuration register can take a variety of forms. For example, it could be a one-time programmable (OTP) or similarly protected non-volatile configuration register. As an alternative, it could be a Flash or EEPROM register that is only rewritable by the bootloader code. As a further alternative, it could take the form of metadata read by the bootloader code, programmed into the register, and then locked so that even the trusted execution environment cannot change it.

There are a number of ways in which the memory slice defining storage element may identify the memory slice. In one example implementation, the memory slice defining storage element is arranged to identify a range of memory addresses forming the memory slice. For example, the storage element may provide a limit address, such that accesses on one side of the limit address are treated as being accesses to the protected memory slice. As another example, a prefix and mask may be used. The prefix is a memory address and the mask is a set of bits to reserve for the trusted execution environment within that memory address. Typically, the prefix's lowest bit set to 1 must be at a higher bit position than the mask's greatest bit set to 1. Such an approach can be used to limit the choice of memory slices to power-of-two slices. This approach can be useful as it can be less expensive to implement than the use of dedicated "greater than" and "less than" comparators.

In one example implementation, the apparatus may further comprise access control circuitry used to control access to memory by the processing circuitry, and the data protection circuitry may be arranged to control the access control circuitry to enable access to the memory slice by the processing circuitry when the processing circuitry is executing the TEE interrupt service routine. In one particular example, the access control circuitry may take the form of a memory protection unit (MPU), with the interrupt controller circuitry having a sideport into the MPU to enable the interrupt controller circuitry to influence which address ranges are accessible for read and/or write operations when executing the TEE interrupt service routine. In such an implementation, the earlier-mentioned memory slice defining storage element may be provided by storage within the MPU.

Particular example implementations will now be discussed with reference to the figures.

FIG. 1 is a block diagram of a system in accordance with one example implementation. A processing unit 10 (in the example of FIG. 1 this taking the form of a central processing unit (CPU)) is provided that includes processing circuitry 15 for performing data processing operations. During performance of the data processing operations, the processing circuitry may have access to a set of general purpose registers 20 used to store data processed by the processing circuitry when performing those data processing operations, and may also have access to a number of special function registers 25. Access to the special function registers can be restricted so that the processing circuitry only has access to certain of those registers when performing particular activities. The CPU 10 may also include access control circuitry 30 to perform access control operations to review an access request issued by the processing circuitry when seeking to access memory in order to check that that access request is allowed prior to forwarding that access request to memory. In the example shown in FIG. 1, the CPU 10 is connected to memory 75 via an interconnect 70. For simplicity in the figure, no cache structures are shown, but it will be understood that in many example systems there may be one or more levels of cache interposed between the CPU 10 and the memory 75.

An interrupt controller 35 is provided that is able to assert an interrupt signal over path 92 to the CPU 10 to cause the processing circuitry to interrupt its current processing operations, in order to execute an interrupt service routine identified by the interrupt signal. An interrupt service routine may take the form of a block of code to be executed by the processing circuitry to handle an interrupt request that has been asserted within the system, and following execution of the interrupt service routine, the processing circuitry will then typically resume continuation of the code it was executing prior to performing the interrupt service routine.

In a typical system, interrupt requests can be issued by a variety of sources within the system, and these various interrupt requests 90 are routed to the interrupt controller 35. In the event that more than one interrupt request is being asserted to the interrupt controller 35, then interrupt selection circuitry 55 within the interrupt controller is used to determine which interrupt request to service first. In one example implementation, different priority levels can be associated with each of the interrupt requests, and hence the interrupt selection circuitry 55 can be arranged to select the highest priority interrupt request to process first. If an interrupt service routine is currently being executed by the processing circuitry 50 in response to a currently asserted interrupt signal, then the priority of the currently active interrupt request associated with that interrupt service routine is also taken into account, and the interrupt selection circuitry 55 is arranged so as to only select a pending interrupt request 90 from amongst those received if one of those pending interrupt requests has a higher priority than the currently active interrupt request being processed.

By default, the interrupt selection circuitry 55, when considering any received interrupt request 90, can be arranged to perform a lookup within an interrupt table 84 in memory 75 in order to identify information relating to that interrupt request, including the earlier-mentioned priority of that interrupt request. The interrupt table 84 can take a variety of forms, but in one example implementation is arranged to identify, for each possible interrupt request, a priority of that interrupt request, and an address indication used to identify a location in memory 75 of the interrupt service routine 82 associated with that interrupt request. When a pending interrupt request 90 is selected by the interrupt controller 35, it will issue an interrupt signal over path 92 to the processing circuitry providing information about the associated interrupt request, including for example the location in memory 75 of the relevant interrupt service routine 82 that the processing circuitry needs to execute to service that interrupt request.

When an interrupt service routine is executed by the processing circuitry 15, one or more response signals may be returned over path 94 to the interrupt controller 35. For example, a response signal may be issued to identify when execution of the interrupt service routine has completed.

In accordance with the techniques described herein, one of the possible interrupt requests 90 that may be received by the interrupt controller 35 is a trusted execution environment (TEE) interrupt request, which is considered to be the highest priority interrupt request that can be received by the interrupt controller. Since the TEE interrupt request is de facto the highest priority interrupt request, there is no need to access the earlier-mentioned interrupt table 84 in order to assess its priority. Once the TEE interrupt request has been selected by the interrupt controller, and a corresponding interrupt signal asserted to the processing circuitry to identify the TEE interrupt service routine to be executed, execution of that TEE interrupt service routine cannot be interrupted by any other code. Hence, for example any other interrupt requests 90 received by the interrupt controller 35 will not be processed whilst the TEE interrupt service routine is being executed, and only once the TEE interrupt service routine has completed execution will any other pending interrupt requests 90 be able to be selected by the interrupt controller.

Such an approach hence allows the TEE interrupt service routine to be used to implement a trusted execution environment, and ensures that execution of that TEE interrupt service routine cannot be interrupted by any other code, thus preventing tampering with the trusted execution environment. Further, in accordance with the techniques described herein, the interrupt controller 35 has code protection circuitry 40 that can be used to ensure that the TEE interrupt service routine cannot be modified in any unauthorised way. In one example implementation, rather than obtaining the memory address associated with the TEE interrupt service routine from the earlier-mentioned interrupt table 84, that address is instead determined by the code protection circuitry 40, in one example implementation this being achieved by the code protection circuitry obtaining from a locked storage element the required memory address indication. In addition, data protection circuitry 45 provided by the interrupt controller 35 is used to ensure that the confidential nature of data being processed by the TEE interrupt service routine is preserved by preventing unauthorised access to such confidential data.

In addition to the earlier-described general purpose registers 20 and special function registers 25 that may be provided within the processing unit 10, various other registers within the system may be accessed when executing the TEE interrupt service routine to implement the protection measures provided by the code protection circuitry 40 and/or the data protection circuitry 45. These may include one or more peripheral registers 60, one or more one-time programmable (OTP) registers 65, and one or more control registers 50 (also referred to herein as exception registers) provided within the interrupt controller 35 (such control registers 50 may also be referred to as peripheral registers as they are external to the CPU 10).

The system may also include other components, for example direct memory access (DMA) circuitry 96 that can be arranged to perform certain memory access operations on behalf of the processing circuitry 15 in certain situations.

As also shown in FIG. 1, there may be provided within memory 75 boot loader code 80 which is executed following a reset of the system to perform a boot operation. During this process, the boot loader code 80 may be arranged, as discussed elsewhere herein, to set the values in one or more of the registers mentioned earlier, with those values then being fixed once the boot process is exited.

Figure 2:
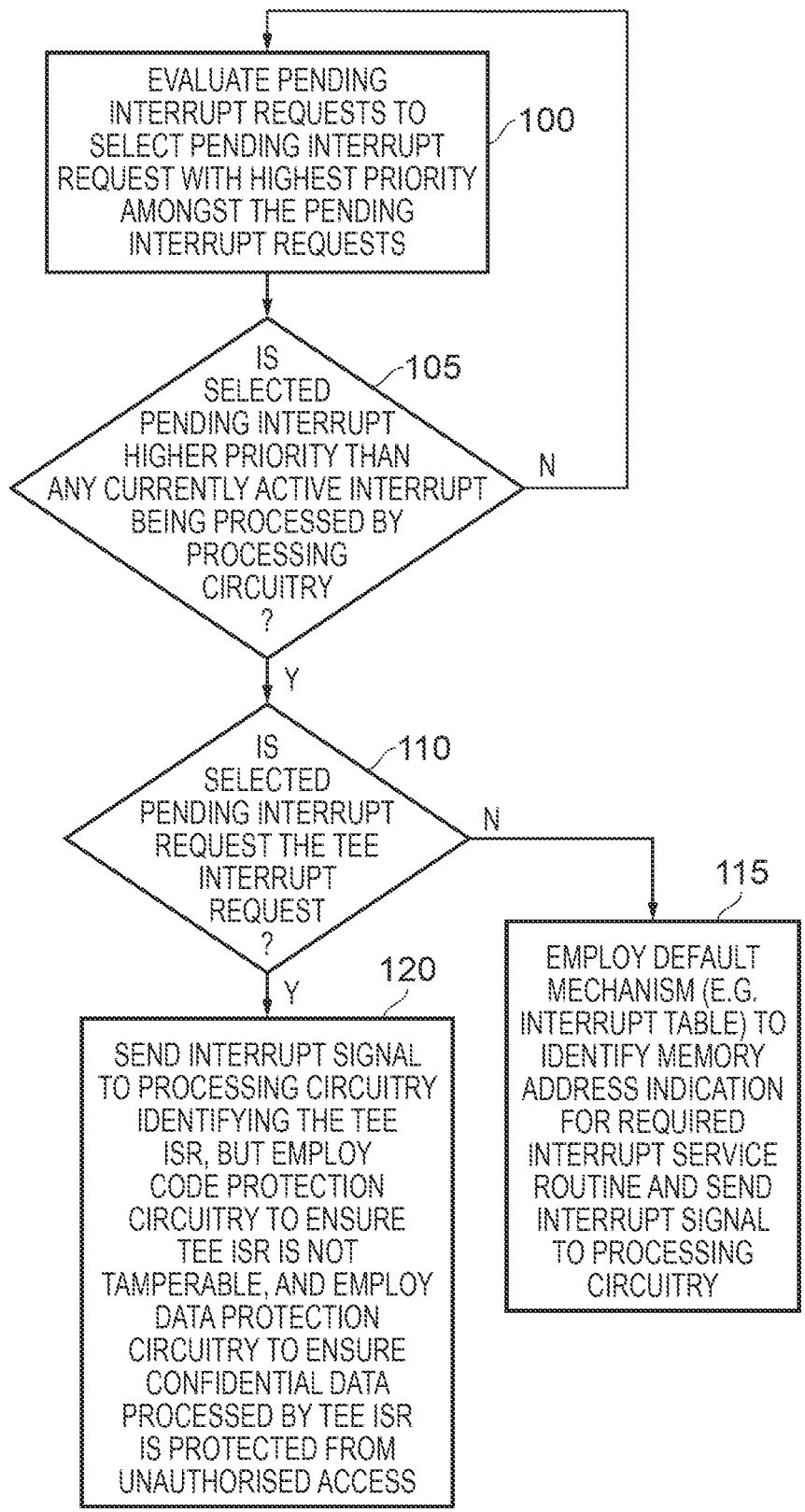
FIG. 2 is a flow diagram illustrating the handling of interrupt requests in accordance with one example implementation.

FIG. 2 is a flow diagram illustrating the operation of the interrupt controller 35 when evaluating pending interrupt requests, in accordance with one example implementation. At step 100, the interrupt controller 35 is arranged to evaluate the pending interrupt requests in order to select a pending interrupt request with the highest priority amongst the pending interrupt requests 90. As mentioned earlier, this may involve reference to the interrupt table 84 in memory 75 to assess the relative priorities of the pending interrupt requests. However, as also discussed earlier, if one of the pending interrupt requests is the TEE interrupt request, this will de facto have the highest priority, and there will be no need to access the interrupt table 84 to determine the highest priority interrupt request. Further, in one example implementation it is not necessary to access the interrupt table 84 in order to determine the location of the TEE interrupt service routine, since for the TEE interrupt service routine the code protection circuitry 40 can be arranged to obtain from a locked storage element the memory address indication to be used by the processing circuitry to retrieve the TEE interrupt service routine.

Once one of the pending interrupt requests has been selected at step 100, then at step 105 it is determined whether the selected pending interrupt request has a higher priority than any currently active interrupt being processed by the processing circuitry. In particular, the interrupt request selected at step 100, whilst being the highest priority amongst any currently pending interrupt requests 90, may not have a higher priority than the current interrupt request that is being handled by the processing circuitry 15 (assuming the processing circuitry is already executing an interrupt service routine at the time). From the earlier discussions, it will be appreciated that this will definitely not be the case if any currently active interrupt request is the TEE interrupt request (and hence the processing circuitry is currently executing the TEE interrupt service routine), since that will always be the highest priority interrupt request.

If it is determined at step 105 that the currently selected pending interrupt request does not have a higher priority than any currently active interrupt request being processed by the processing circuitry, then the process merely returns to step 100. However, if it is determined at step 105 that the currently selected pending interrupt is a higher priority than any currently active interrupt being processed by the processing circuitry, or indeed if there is no currently active interrupt being processed by the processing circuitry, then the process proceeds to step 110 where it is determined whether the selected pending interrupt request is the TEE interrupt request.

If not, then at step 115 a default mechanism is used to identify the memory address indication for the required interrupt service routine, for example by referencing the earlier-mentioned interrupt table 84, and then an interrupt signal is sent over path 92 to the processing circuitry to identify that interrupt service routine.

However, if the selected pending interrupt request is the TEE interrupt request, then at step 120 an interrupt signal is sent to the processing circuitry identifying the TEE interrupt service routine. In contrast to the default mechanism discussed with reference to step 115, in this case the code protection circuitry 40 is employed to ensure that the TEE interrupt service routine is not tamperable (as mentioned earlier this may involve the code protection circuitry 40 obtaining the address of the TEE interrupt service routine from a locked storage element). In addition, the data protection circuitry 45 is employed to ensure that confidential data processed by the TEE interrupt service routine is protected from unauthorised access. More details of the various code protection and data protection mechanisms that may be employed by the code protection circuitry 40 and data protection circuitry 45, respectively, will now be discussed with reference to the remaining figures.

Figure 3:
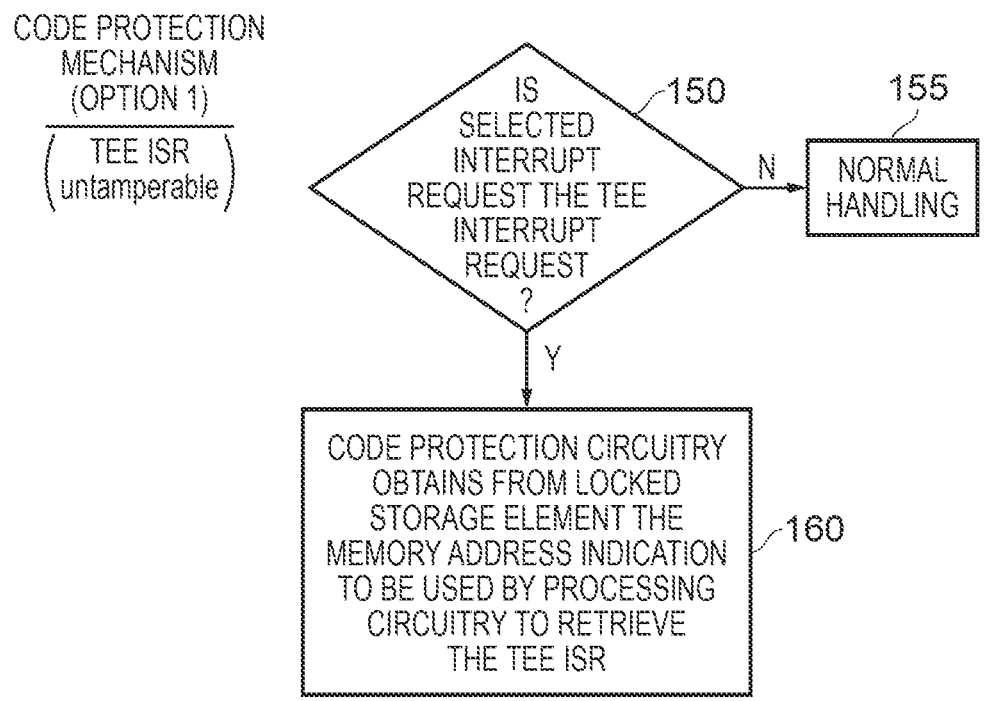
FIG. 3 is a flow diagram illustrating a code protection mechanism that may be implemented in accordance with one example implementation.

FIG. 3 is a flow diagram illustrating a first form of code protection mechanism that can be implemented using the code protection circuitry 40, with the aim of making the TEE interrupt service routine (ISR) untamperable. At step 150, it is determined whether the interrupt request that has been selected by the interrupt controller for handling is the TEE interrupt request. If not, then the interrupt request is handled in the normal way at step 155. However, if it is the TEE interrupt request, then the code protection circuitry 40 is arranged to obtain from a locked storage element the memory address indication that is to be used by the processing circuitry to retrieve the TEE ISR, with that memory address indication then being provided within the interrupt signal routed over path 92 to the CPU 10.

The locked storage element could take a variety of forms. For example, it could be an OTP register such as the OTP register 65 indicated in FIG. 1. Alternatively, it could be a lockable register that can be set by early execution code that is executed following a reset of the apparatus, an example of such early execution code being boot loader code. Once the value has been set in the lockable register by such early execution code, the register can then be locked by that early execution code prior to the early execution code being exited. Such a lockable register could be provided at a variety of locations within the system, dependent on implementation, but by way of particular example it could take the form of one of the control registers 50, also referred to herein as exception registers, provided within the interrupt controller 35.

As a yet further example of the locked storage element, it could take the form of a hardwired storage element providing as the memory address indication an entry point for the TEE interrupt service routine that is provided in unmodifiable memory, for example mask ROM or OTP ROM.

As an alternative mechanism to inhibit unauthorised modification of the TEE interrupt service routine, or as an additional mechanism used in combination with the approach described with reference to FIG. 3, the TEE interrupt service routine may be cryptographically signed. Hence, in accordance with this approach TEE interrupt service routine may be protected by signing it using an untamperable key. The form of the key or keys used in this process may be dependent on implementation, and hence for example could involve a symmetric scheme where the same, secret, key is used to both encrypt the TEE interrupt service routine, and in due course to decrypt the TEE interrupt service routine, or alternatively could involve the use of an asymmetric scheme where a pair of keys (a private key and a public key) are used, one for encryption and the other for decryption.

Figure 4:
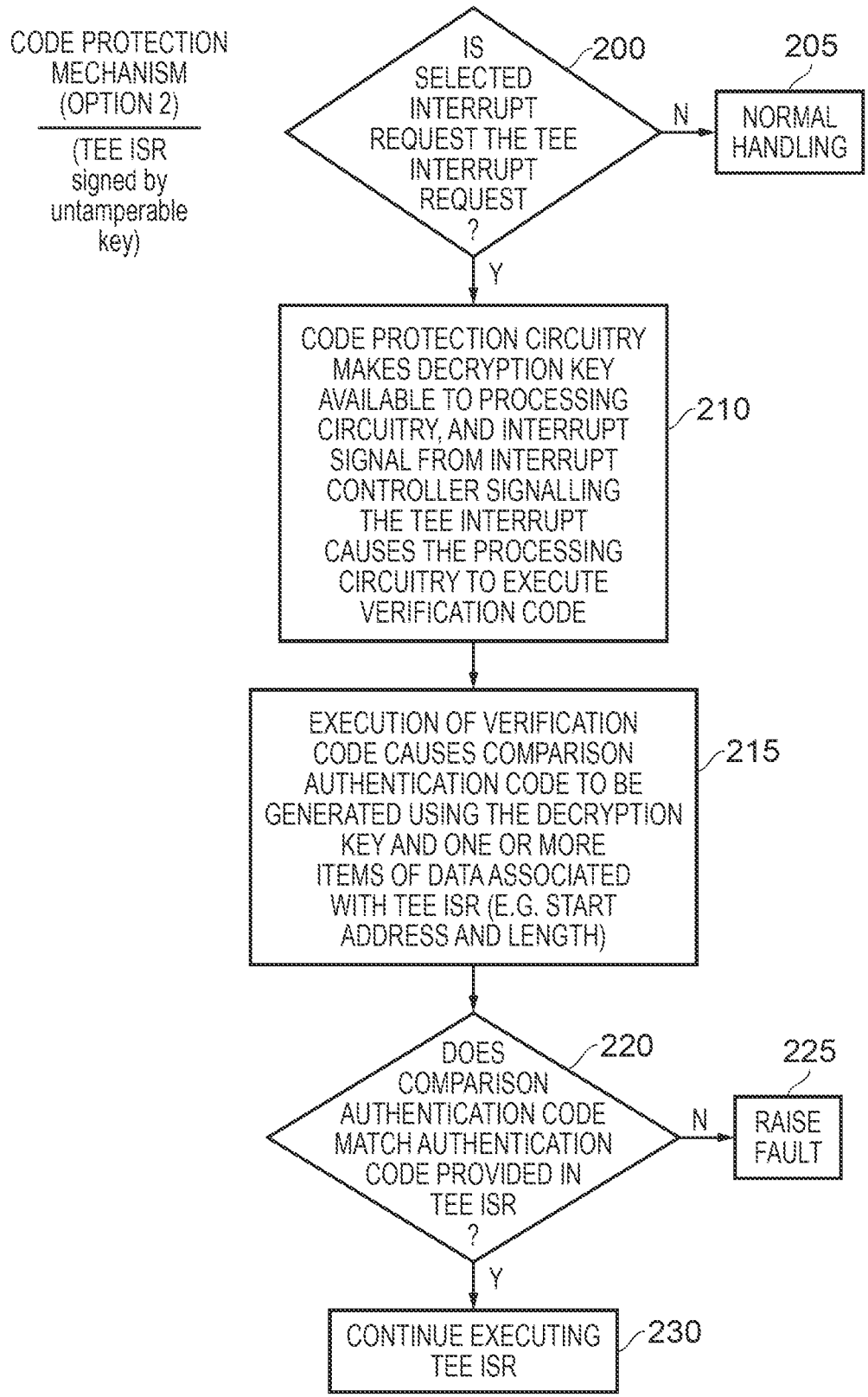
FIG. 4 is a flow diagram illustrating another code protection mechanism that may be implemented in accordance with one example implementation.

One example approach for achieving such cryptographic signing of the TEE interrupt service routine, in this example using a symmetric scheme, is described with reference to the flow diagram of FIG. 4. In this particular example it is assumed that encryption and decryption keys are used. At step 200, it is determined whether the pending interrupt request selected by the interrupt controller 35 is the TEE interrupt request. If not, then the interrupt request is handled in the normal way at step 205. However, if the selected interrupt request is the TEE interrupt request, then the process proceeds to step 210, where the code protection circuitry 40 makes a decryption key available to the processing circuitry when instructing the processing circuitry to execute the TEE interrupt service routine. The interrupt signal sent over path 92 to the processing circuitry causes the processing circuitry to execute verification code in order to verify the TEE interrupt service routine before executing the code of that TEE interrupt service routine. The verification code can be made untamperable, for example by providing that code within unmodifiable memory, such as mask ROM.

Execution of the verification code then takes place at step 215, this causing a comparison authentication code to be generated using the decryption key and one or more items of data associated with the TEE interrupt service routine. The data used for this purpose can take a variety of forms, but could for example include a start address and length information identifying the length of the interrupt service routine. Such length information could be provided in a variety of ways, but in one example implementation may be provided within a stub portion of the TEE interrupt service routine, which may also include other data such as an authentication code for the TEE interrupt service routine.

At step 220, the verification code determines whether the comparison authentication code that has been generated at step 215 matches the authentication code that has been provided in the TEE interrupt service routine, which as mentioned earlier could for example be provided within a stub portion of the TEE interrupt service routine. If not, then a fault can be raised at step 225, and execution of the TEE interrupt service routine will be prevented, at least until the fault has been resolved. However, if the authentication code check at step 220 is passed, then the process proceeds to step 230 where the processing circuitry can continue to execute the TEE interrupt service routine.

Figure 5:
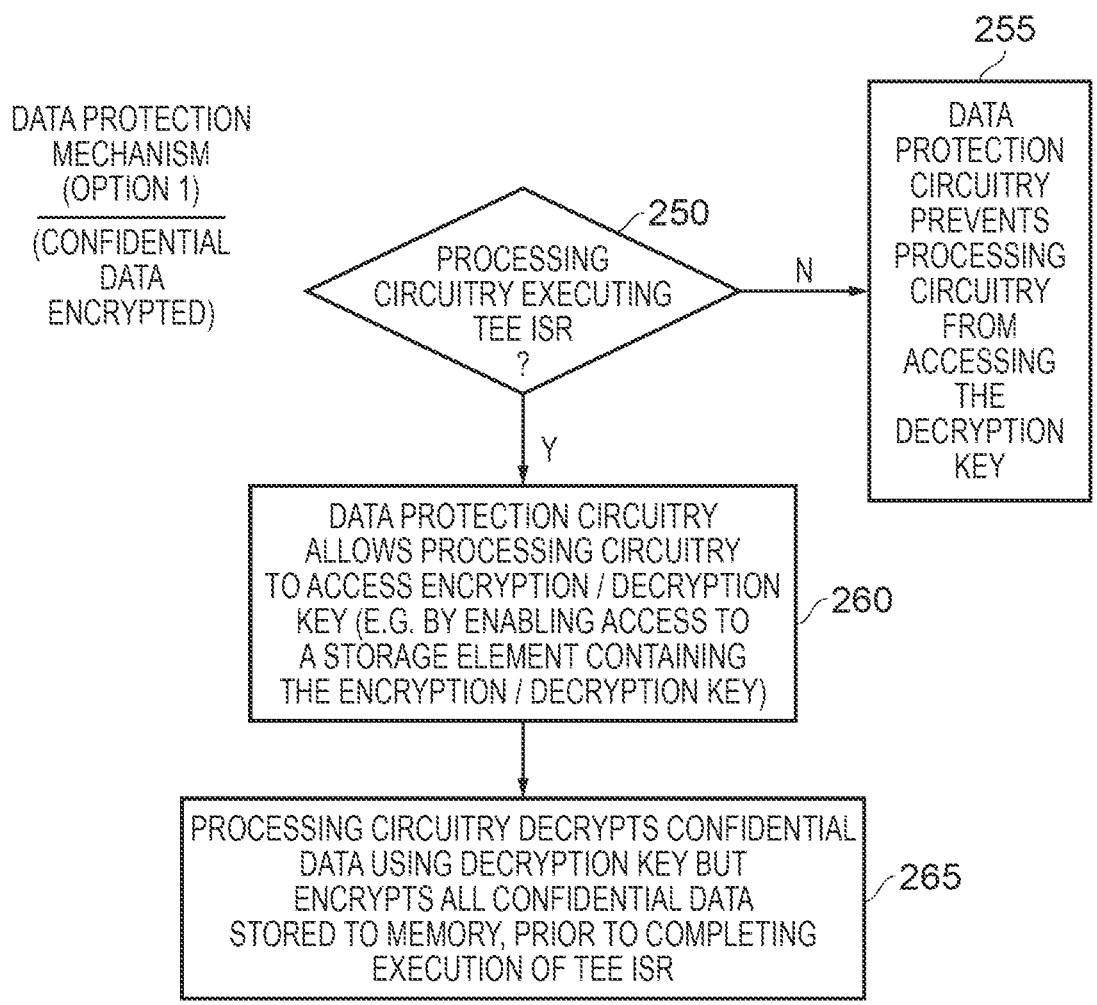
FIG. 5 is a flow diagram illustrating a data protection mechanism that may be implemented in accordance with one example implementation.

FIG. 5 is a flow diagram illustrating a first form of data protection mechanism that may be implemented using the data protection circuitry 45, this approach seeking to maintain the confidentiality of the data by encrypting that data unless it is actively being used by the TEE interrupt service routine. At step 250, it is determined whether the processing circuitry is executing the TEE interrupt service routine. If not, then at step 255 the data protection circuitry prevents the processing circuitry from accessing a decryption key that would be required to decrypt any confidential data used by the TEE interrupt service routine.

However, if the processing circuitry is executing the TEE interrupt service routine, then at step 260 the data protection circuitry 45 allows the processing circuitry 15 to access both the encryption key required to encrypt confidential data and the decryption key required to decrypt the confidential data. Depending on the scheme used, the encryption key and the decryption key may be the same key, or may be different keys. There are various ways in which the data protection circuitry can allow the processing circuitry to access such keys, but in one example this is achieved by enabling access to one or more storage elements that contain the encryption and decryption key(s).

The storage element or elements that is/are used to contain the encryption and decryption key can take a variety of forms. For example, they may take the form of one or more peripheral registers external to the CPU 10 which the processing circuitry 15 is only allowed to access when executing the TEE interrupt service routine. The data protection circuitry 45 can enable and disable access to each such peripheral register dependent on whether the processing circuitry is or is not executing the TEE interrupt service routine. Such a peripheral register may be one of the peripheral registers 60 shown in FIG. 1, or a register within the interrupt controller 35, such as one of the control registers 50.

Alternatively, the storage element that is used to contain the encryption and decryption key may be at least one special function register 25 within the CPU 10 that the processing circuitry 15 is only enabled to access when executing the TEE interrupt service routine. In one example implementation, boot loader code 80 may store the encryption key and decryption key within such a special function register during a boot operation, with the data protection circuitry 45 then controlling when the processing circuitry is allowed to access that special function register.

As a still further example, the storage element that is used to contain the encryption and decryption key may take the form of at least one general purpose register 20 within the CPU 10, in which the CPU is enabled by the data protection circuitry 45 to maintain a copy of the encryption and decryption key whilst the processing circuitry is executing the TEE interrupt service routine.

At step 265, the processing circuitry can then decrypt confidential data using the decryption key, so as to allow that confidential data to be processed whilst the processing circuitry is executing the TEE interrupt service routine. In addition, the processing circuitry will encrypt all confidential data that is stored to memory, prior to completing execution of the TEE interrupt service routine, so that any confidential data that could potentially be accessed after the TEE interrupt service routine has completed execution will be encrypted, and hence unusable.

Figure 6:
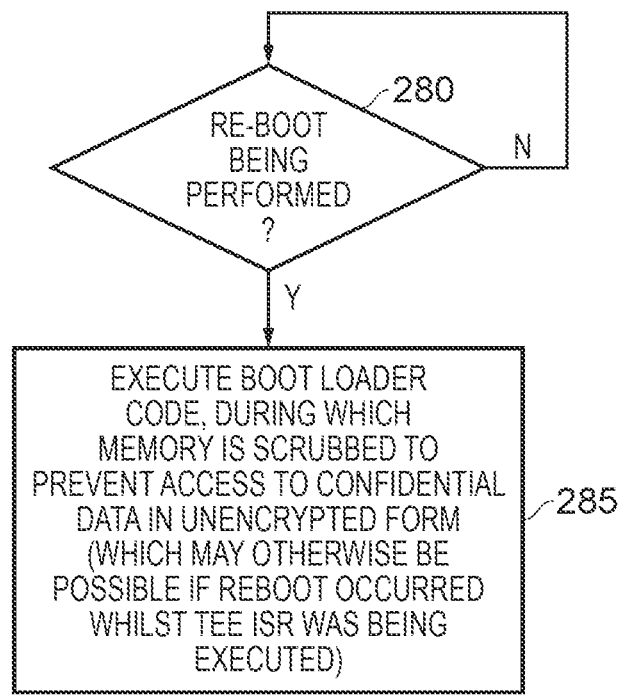
FIG. 6 is a flow diagram illustrating steps that may be taken upon a reset of the apparatus in accordance with one example implementation.

As mentioned earlier, since the TEE interrupt request is the highest priority interrupt request, execution of the TEE interrupt service routine by the processing circuitry cannot be interrupted by other code. However, in some implementations, it may be possible that a reset of the apparatus could occur whilst the TEE interrupt service routine is being executed, which could potentially result in confidential data in decrypted form being stored in memory. FIG. 6 illustrates a process that could be performed in one example implementation during performance of the reset, to ensure that any such decrypted confidential data is removed so that it is not accessible once the boot operation is complete. In particular, at step 280, it is determined whether a reboot is being performed following a reset of the apparatus. If it is, then at step 285 boot loader code is executed, during which memory is scrubbed in order to prevent access to confidential data in unencrypted form.

As an alternative to cryptographically protecting the confidential data as discussed above, or as an additional mechanism to provide further protection of the confidential data, access control techniques can be used to limit access to the confidential data, under the control of the data protection circuitry 45. For example, access control circuitry (denoted by way of example schematically in FIG. 1 by element 30) can be provided to which any access request seeking to access the confidential data must be routed before allowing the confidential data to be accessed. The access control circuitry may then be controlled by the data protection circuitry to prevent access to the confidential data unless the processing circuitry is executing the TEE interrupt service routine. The form of the access control circuitry can vary dependent on implementation, as can the location of the access control circuitry. By way of example the functionality of the access control circuitry may be implemented by bus arbiter circuitry (an example of which will be discussed later with reference to FIG. 8), a memory management unit (MMU) within the system, and/or a memory protection unit (MPU).

Figure 7:
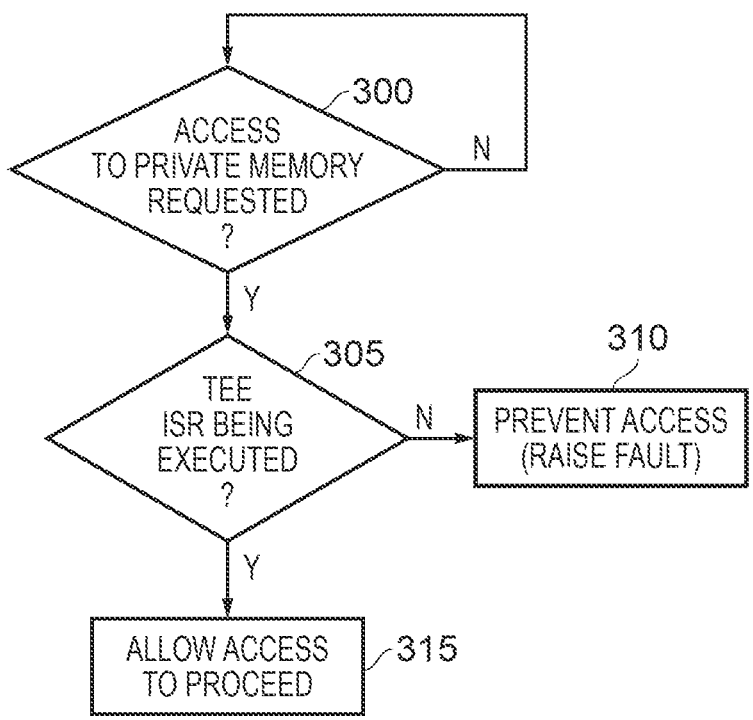
FIG. 7 is a flow diagram illustrating another data protection mechanism may be implemented in accordance with one example implementation.

The memory used by the processing circuitry when executing the TEE interrupt service routine can take a variety of forms. FIG. 7 is a flow diagram illustrating an alternative, or additional, data protection mechanism that could be implemented using the data protection circuitry 45 in situations where private memory is used for the confidential data processed by the TEE interrupt service routine. At step 300, it is determined whether access to private memory is being requested, and if so it is then determined at step 305 whether the TEE interrupt service routine is being executed by the processing circuitry. If not, then at step 310 access to the private memory is prevented, for example by raising a fault. However, if the TEE interrupt service routine is being executed, then access to the private memory is allowed to proceed at step 315. Hence, confidential data processed by the TEE ISR can then be stored in private memory.

Figure 8:
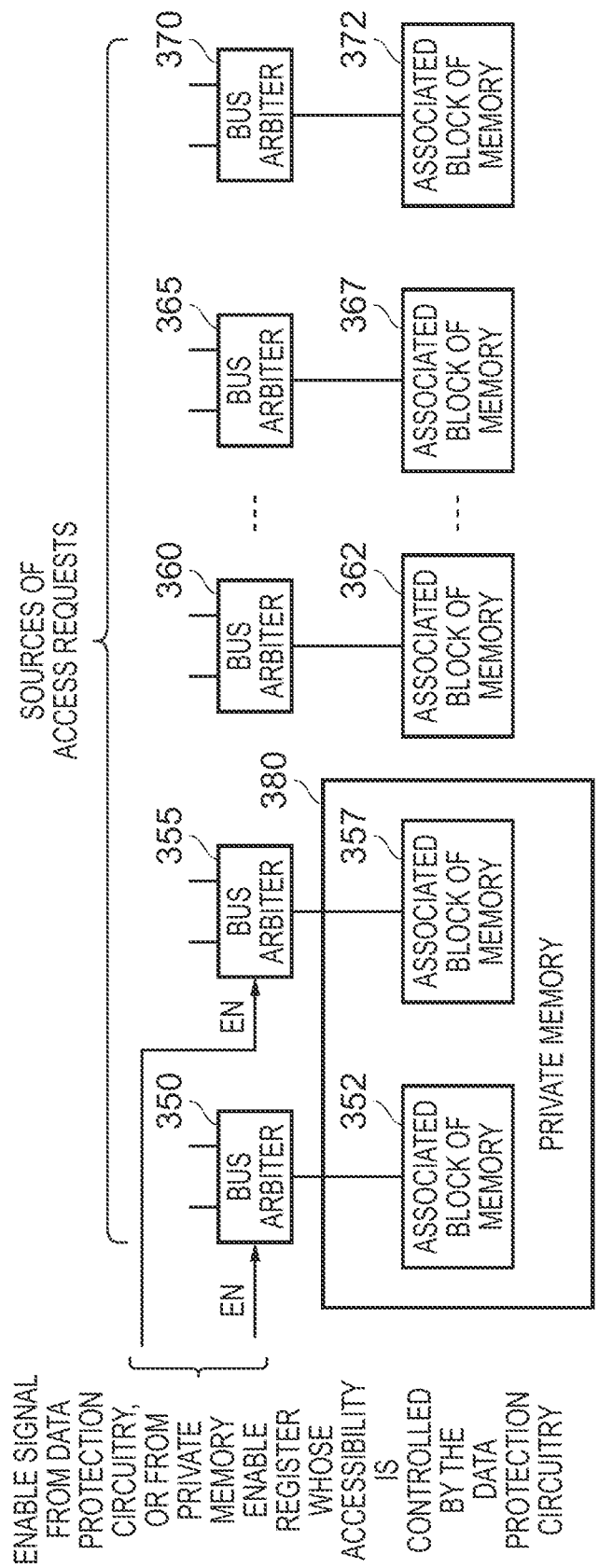
FIG. 8 is a diagram schematically illustrating how bus arbiters may be used to control access to private memory in accordance with one example implementation.

FIG. 8 is a diagram schematically illustrating how bus arbiters may be used to implement such a scheme for protecting access to private memory. As illustrated in FIG. 8, a series of bus arbiters 350, 355, 360, 365, 370 can be provided for associated blocks of memory 352, 357, 362, 367, 372. Each bus arbiter can be connected to a plurality of sources of access requests seeking to access the associated block of memory, and can act as a gate to determine whether such access requests should be forwarded on to the associated block of memory or not. As shown in FIG. 8, a number of the associated blocks of memory (in this example the blocks 352 and 357) may form private memory 380. At least for the bus arbiters associated with blocks of memory within the private memory 380, an enable signal can be provided to those bus arbiters to control whether or not they should allow access requests received by them to be forwarded on to the private memory. In a default mode of operation, each bus arbiter 350, 355 whose associated block of memory 352, 357 is within the private memory 380 is arranged to raise a fault signal if the processing circuitry seeks to access the associated block of memory. This default mode of operation may for example be the mode of operation that such bus arbiters employ in the absence of an asserted enable signal. However, in a further mode of operation, for example when the enable signal is asserted, such bus arbiters associated with blocks of memory in private memory may be arranged so as to allow the processing circuitry executing the TEE interrupt service routine to access those blocks of memory. The enable signal can be controlled by the data protection circuitry, and hence can be arranged to only be asserted when the processing circuitry is executing the TEE interrupt service routine.

In one example implementation, the bus arbiters can be located in a manner that seeks to prevent their access control function being bypassed. For example, each bus arbiter whose associated block of memory is within the private memory may be arranged to be located relative to the associated block of memory so as to inhibit provision of a bypass path that would enable the associated block of memory to be accessed without routing the access through the bus arbiter. Such an approach could for example be used to inhibit a direct memory access (DMA) bypass in implementations where direct memory access circuitry 96 is provided to perform certain memory accesses on behalf of the processing circuitry 15, by locating the bus arbiters close to their associated block of memory.

As an alternative to the data protection circuitry 45 providing an enable signal to each of the bus arbiters associated with blocks of memory in private memory, the data protection circuitry could instead be arranged to control access to a private memory enable register, such that when access to that private memory enable register is disabled the bus arbiters 350, 355 associated with blocks of memory 352, 357 in private memory 380 are caused to operate in the earlier-mentioned default mode of operation. In contrast, when access to the private memory enable register is enabled by the data protection circuitry 45, each of those bus arbiters 350, 355 is enabled so as to operate in the above-described further mode of operation, so as to allow access to the private memory by the processing circuitry executing the TEE interrupt service routine.

Whilst in the above example it is assumed that enabling access to the private memory enable register causes the relevant bus arbiters 350, 355 to be enabled, in an alternative implementation such enabled access to the private memory enable register may cause local enable signals to be provided to the relevant blocks of memory 352, 357 directly (in one particular example generating RAM local enable signals to those blocks of memory).

The private memory enable register can be provided by any suitable register within the system, but in one example implementation could take the form of one of the control registers 50 within the interrupt controller 35.

It will be appreciated that the above described enabling and disabling of the bus arbiters associated with blocks of memory in private memory can be seen as a coarse-grained control for the bus arbiters, and an enabled bus arbiter may also apply a finer grain of decision-making (as indeed may any of the bus arbiters 360, 365, 370 associated with blocks of memory that are not in private memory) to decide whether any particular access request received by it should be propagated on to the associated block of memory or not.

In one example implementation, it may be possible to arrange the bus arbiters to only allow the processing circuitry (typically the CPU) to access the private memory whilst the TEE ISR is being executed, and to block accesses to private memory by any other processing elements (for example a DMA). In an alternative implementation, the apparatus may be arranged so as to always prevent access to the private memory by processing elements other than the CPU, or to pause the activities of any other processing elements other than the CPU whilst the TEE ISR is being executed.

Figure 9:
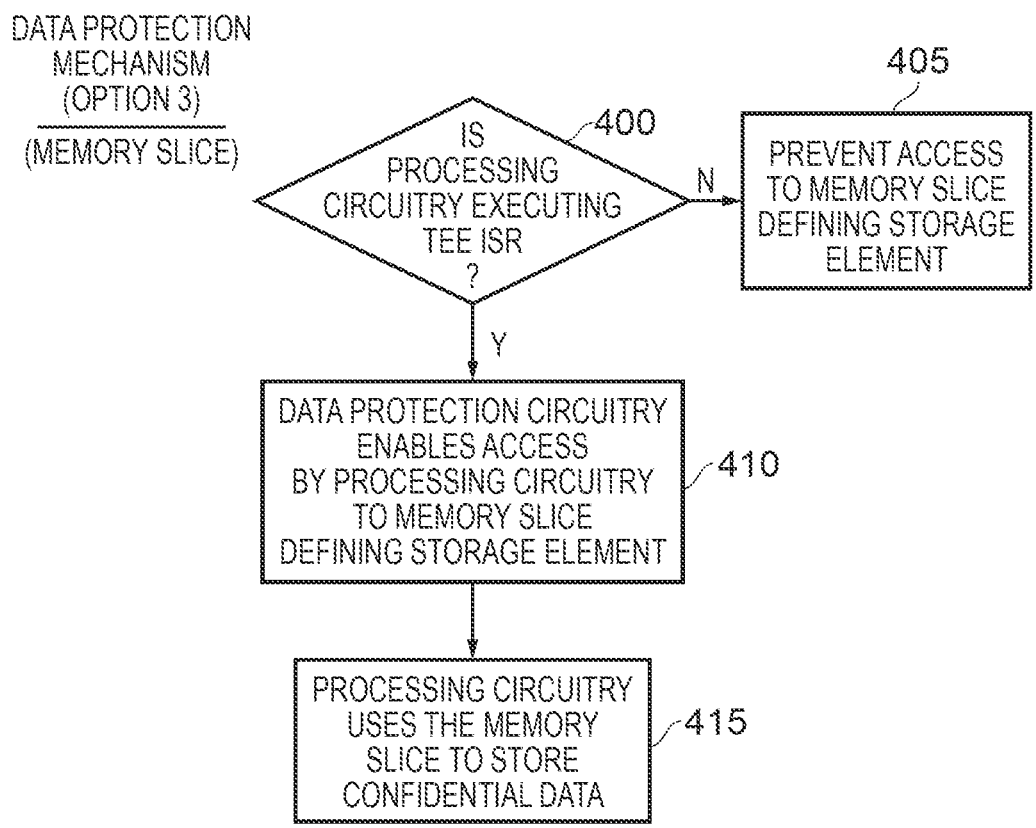
FIG. 9 is a flow diagram illustrating another data protection mechanism that may be implemented in accordance with one example implementation.

FIG. 9 is a flow diagram illustrating a third possible data protection mechanism that can be employed, based on the use of one or more memory slices that the data protection circuitry 45 is arranged to only enable the processing circuitry 15 to access when the processing circuitry is executing the TEE interrupt service routine. At step 400, it is determined when the processing circuitry is executing the TEE interrupt service routine, and if not at step 405 access is prevented to a memory slice defining storage element that defines at least one memory slice available to the processing circuitry when executing the TEE interrupt service routine.

However, if the processing circuitry is executing the TEE interrupt service routine, then at step 410 the data protection circuitry 45 enables access by the processing circuitry 15 to the memory slice defining storage element. The memory slice defining storage element can store information about the memory slice(s) in a variety of ways, but in one example implementation can identify a range of memory addresses that form each such memory slice.

The memory slice defining storage element can take a variety of forms. For example, it may take the form of a peripheral register such as the peripheral register 60 shown in FIG. 1, with the processing circuitry only being able to access that peripheral register when executing the TEE interrupt service routine. Alternatively, it could take the form of one of the special function registers 25 within the processing unit, and again the processing circuitry may be only able to access that special function register when executing the TEE interrupt service routine. As yet another example, it may take the form of a lockable configuration register that the processing circuitry is only able to access when executing the TEE interrupt service routine, for example an OTP register such as the OTP register 65 shown in FIG. 1 or a similarly protected non-volatile configuration register.

Once at step 410 the processing circuitry has been given access to the memory slice defining storage element, it can identify the memory slice, and then at step 415 may use the memory slice to store the confidential data processed whilst executing the TEE interrupt service routine.

It will be appreciated from the above descriptions of example implementations that the techniques described herein provide a low complexity and low cost mechanism for implementing a trusted execution environment using an exception-based mechanism.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts.

The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. The code may comprise a myHDL representation which is subsequently compiled into a Verilog representation. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

Additionally, examples of the present technique may be configured according to the clauses below.

1. An apparatus comprising:
   processing circuitry to execute program code; and
   interrupt controller circuitry, responsive to receipt of one or more interrupt requests, to select a given interrupt request from amongst the one or more interrupt requests, and to issue an interrupt signal to the processing circuitry identifying a given interrupt service routine providing program code to be executed by the processing circuitry to service the given interrupt request;
   wherein:
   the interrupt controller circuitry is responsive to the given interrupt request being a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry;
   the interrupt controller circuitry comprises code protection circuitry to inhibit unauthorised modification of the TEE interrupt service routine; and
   the interrupt controller circuitry further comprises data protection circuitry to inhibit unauthorised access to confidential data processed by the TEE interrupt service routine.

2. An apparatus as in Clause 1, wherein the interrupt controller circuitry is arranged to employ a prioritization scheme to select the given interrupt request from amongst the one or more received interrupt requests, and the TEE interrupt request is arranged to have a higher priority than any other interrupt request receivable by the interrupt controller circuitry, to thereby ensure that once an interrupt signal has been issued to the processing circuitry to cause the processing circuitry to execute the TEE interrupt service routine, the interrupt controller circuitry is inhibited from issuing an interrupt signal for any other received interrupt request until the TEE interrupt service routine has been executed by the processing circuitry.

3. An apparatus as in Clause 1 or Clause 2, wherein:
   the interrupt controller circuitry is arranged to identify the given interrupt service routine in the interrupt signal by identifying a memory address indication to be used by the processing circuitry to retrieve the given interrupt service routine from memory;
   the interrupt controller circuitry is arranged to employ a default mechanism to determine the memory address indication for the given interrupt request; and
   the code protection circuitry is arranged, when the given interrupt request is the TEE interrupt request, to obtain from a locked storage element the memory address indication to be used by the processing circuitry to retrieve the TEE interrupt service routine instead of employing the default mechanism.

4. An apparatus as in Clause 3, wherein the locked storage element comprises one of:
   a one-time programmable register set to identify the memory address indication to be used by the processing circuitry to retrieve the TEE interrupt service routine;
   a lockable register whose value is arranged to be set by early execution code executed by the processing circuitry following a reset of the apparatus, and the lockable register is arranged to be locked by the early execution code; and
   a hard-wired storage element providing as the memory address indication an entry point for the TEE interrupt service routine that is provided in unmodifiable memory.

5. An apparatus as in any preceding clause, wherein:
   the TEE interrupt service routine is cryptographically signed using an authentication key;
   the processing circuitry is arranged, in response to the interrupt signal identifying
   the TEE interrupt service routine, to execute verification code to determine whether the TEE interrupt service routine is verified; and
   the code protection circuitry is arranged to have access to an authenticity verification key and to make the authenticity verification key available to the verification code when determining whether the TEE interrupt service routine is verified.

6. An apparatus as in Clause 5, wherein:
   the authentication key is the same as the authenticity verification key;
   the TEE interrupt service routine includes an authentication code;
   the processing circuitry is arranged to execute the verification code to generate a comparison authentication code from the decryption key and one or more items of data associated with the TEE interrupt service routine, and to determine that the TEE interrupt service routine is verified when the comparison authentication code matches the authentication code included in the TEE interrupt service routine.

7. An apparatus as in any preceding clause, wherein:
   the confidential data processed by the TEE interrupt service routine is stored in memory in encrypted form, using an encryption key, unless the processing circuitry is executing the TEE interrupt service routine;
   the data protection circuitry is arranged to inhibit the processing circuitry from accessing the encryption key, and a decryption key used to decrypt the confidential data, unless the processing circuitry is executing the TEE interrupt service routine; and
   the processing circuitry is arranged to use the decryption key, whilst executing the TEE interrupt service routine, to decrypt the confidential data to enable the confidential data to be processed during execution of the TEE interrupt service routine and to use the encryption key to encrypt the confidential data prior to completing execution of the TEE interrupt service routine.
8. An apparatus as in Clause 7, wherein the encryption key and the decryption key are stored in a given storage element whose accessibility is controlled by the interrupt controller circuitry, and the data protection circuitry is arranged to enable the processing circuitry to access the given storage element whilst the processing circuitry is executing the TEE interrupt service routine.
9. An apparatus as in Clause 8, wherein the given storage element is one of:
   at least one register external to a processing unit containing the processing circuitry which the processing circuitry is only enabled to access when executing the TEE interrupt service routine;
   at least one special function register within the processing unit that the processing circuitry is only enabled to access when executing the TEE interrupt service routine;
   at least one general purpose register within the processing unit in which the processing unit is enabled, under control of the data protection circuitry, to maintain a copy of the encryption key and the decryption key whilst the processing circuitry is executing the TEE interrupt service routine.
10. An apparatus as in any of clauses 7 to 9, wherein early execution code executed by the processing circuitry following a reset of the apparatus is arranged to scrub memory in order to avoid access to the confidential data in unencrypted form in the event execution of the TEE interrupt service routine was interrupted at a time the apparatus was reset.
11. An apparatus as in any preceding clause, further comprising:
    access control circuitry to which any access request seeking to access the confidential data must be routed before allowing the confidential data to be accessed; and
    the access control circuitry is controlled by the data protection circuitry to prevent access to the confidential data unless the processing circuitry is executing the TEE interrupt service routine.
12. An apparatus as in any preceding clause, wherein memory accessible to the processing circuitry includes private memory, and the data protection circuitry is arranged to only enable the processing circuitry to access the private memory when the processing circuitry is executing the TEE interrupt service routine.
13. An apparatus as in Clause 12, further comprising:
    a plurality of bus arbiters used to arbitrate access to associated blocks of memory;
    in a default mode of operation, each bus arbiter whose associated block of memory is within the private memory is arranged to assert a fault signal if the processing circuitry seeks to access the associated block of memory; and
    the data protection circuitry is arranged to cause each bus arbiter whose associated block of memory is within the private memory to operate in a further mode of operation whilst the processing circuitry is executing the TEE interrupt service routine, in which each bus arbiter whose associated block of memory is within the private memory allows the processing circuitry to access the associated block of memory.
14. An apparatus as in Clause 13, wherein each bus arbiter whose associated block of memory is within the private memory is arranged to be located relative to the associated block of memory so as to inhibit provision of a bypass path that would enable the associated block of memory to be accessed without routing the access through the bus arbiter.
15. An apparatus as in Clause 13 or Clause 14, further comprising:
    direct memory access circuitry which the processing circuitry can utilise to perform chosen memory accesses on behalf of the processing circuitry;
    wherein the data protection circuitry is arranged to cause use of the direct memory access circuitry to be disabled whilst the processing circuitry is executing the TEE interrupt service routine.
16. An apparatus as in any of clauses 12 to 15, wherein the data protection circuitry is arranged to control access to a private memory enable register so as to only enable access to the private memory enable register whilst the processing circuitry is executing the TEE interrupt service routine, and access to the private memory enable register causes the private memory to be made accessible to the processing circuitry.
17. An apparatus as in any preceding clause, wherein memory accessible to the processing circuitry includes a memory slice that the data protection circuitry is arranged to only enable the processing circuitry to access when the processing circuitry is executing the TEE interrupt service routine.
18. An apparatus as in Clause 17, further comprising a memory slice defining storage element whose accessibility is controlled by the interrupt controller circuitry, and the data protection circuitry is arranged to enable the processing circuitry to access the memory slice defining storage element whilst the processing circuitry is executing the TEE interrupt service routine in order to enable the processing circuitry to access the memory slice.
19. An apparatus as in Clause 18, wherein the memory slice defining storage element is one of:
    a register external to a processing unit containing the processing circuitry which the processing circuitry is only enabled to access when executing the TEE interrupt service routine;
    a special function register within the processing unit that the processing circuitry is only enabled to access when executing the TEE interrupt service routine;
    a lockable configuration register that the processing circuitry is only enabled to access when executing the TEE interrupt service routine.
20. An apparatus as in Clause 18 or Clause 19, wherein the memory slice defining storage element is arranged to identify a range of memory addresses forming the memory slice.
21. An apparatus as in any of clauses 18 to 20, further comprising access control circuitry used to control access to memory by the processing circuitry, and the data protection circuitry is arranged to control the access control circuitry to enable access to the memory slice by the processing circuitry when the processing circuitry is executing the TEE interrupt service routine.

The invention claimed is:
1. An apparatus comprising:
processing circuitry to execute program code; and
interrupt controller circuitry, responsive to receipt of one or more interrupt requests, to select a given interrupt request from amongst the one or more interrupt requests, and to issue an interrupt signal to the pro- cessing circuitry identifying a given interrupt service routine providing program code to be executed by the processing circuitry to service the given interrupt request;
wherein:
the interrupt controller circuitry is responsive to the given interrupt request being a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry;
the interrupt controller circuitry comprises code protection circuitry to inhibit unauthorised modification of the TEE interrupt service routine; and
the interrupt controller circuitry further comprises data protection circuitry to inhibit unauthorised access to confidential data processed by the TEE interrupt service routine.

2. An apparatus as claimed in claim 1, wherein the interrupt controller circuitry is arranged to employ a prioritization scheme to select the given interrupt request from amongst the one or more received interrupt requests, and the TEE interrupt request is arranged to have a higher priority than any other interrupt request receivable by the interrupt controller circuitry, to thereby ensure that once an interrupt signal has been issued to the processing circuitry to cause the processing circuitry to execute the TEE interrupt service routine, the interrupt controller circuitry is inhibited from issuing an interrupt signal for any other received interrupt request until the TEE interrupt service routine has been executed by the processing circuitry.

3. An apparatus as claimed in claim 1, wherein:
the interrupt controller circuitry is arranged to identify the given interrupt service routine in the interrupt signal by identifying a memory address indication to be used by the processing circuitry to retrieve the given interrupt service routine from memory;
the interrupt controller circuitry is arranged to employ a default mechanism to determine the memory address indication for the given interrupt request; and
the code protection circuitry is arranged, when the given interrupt request is the TEE interrupt request, to obtain from a locked storage element the memory address indication to be used by the processing circuitry to retrieve the TEE interrupt service routine instead of employing the default mechanism.

4. An apparatus as claimed in claim 3, wherein the locked storage element comprises one of:
a one-time programmable register set to identify the memory address indication to be used by the processing circuitry to retrieve the TEE interrupt service routine;
a lockable register whose value is arranged to be set by early execution code executed by the processing circuitry following a reset of the apparatus, and the lockable register is arranged to be locked by the early execution code; and
a hard-wired storage element providing as the memory address indication an entry point for the TEE interrupt service routine that is provided in unmodifiable memory.

5. An apparatus as claimed in claim 1, wherein:
the TEE interrupt service routine is cryptographically signed using an authentication key;
the processing circuitry is arranged, in response to the interrupt signal identifying the TEE interrupt service routine, to execute verification code to determine whether the TEE interrupt service routine is verified; and
the code protection circuitry is arranged to have access to an authenticity verification key and to make the authenticity verification key available to the verification code when determining whether the TEE interrupt service routine is verified.

6. An apparatus as claimed in claim 5, wherein:
the authentication key is the same as the authenticity verification key;
the TEE interrupt service routine includes an authentication code;
the processing circuitry is arranged to execute the verification code to generate a comparison authentication code from the decryption key and one or more items of data associated with the TEE interrupt service routine, and to determine that the TEE interrupt service routine is verified when the comparison authentication code matches the authentication code included in the TEE interrupt service routine.

7. An apparatus as claimed in claim 1, wherein:
the confidential data processed by the TEE interrupt service routine is stored in memory in encrypted form, using an encryption key, unless the processing circuitry is executing the TEE interrupt service routine;
the data protection circuitry is arranged to inhibit the processing circuitry from accessing the encryption key, and a decryption key used to decrypt the confidential data, unless the processing circuitry is executing the TEE interrupt service routine; and
the processing circuitry is arranged to use the decryption key, whilst executing the TEE interrupt service routine, to decrypt the confidential data to enable the confidential data to be processed during execution of the TEE interrupt service routine and to use the encryption key to encrypt the confidential data prior to completing execution of the TEE interrupt service routine.

8. An apparatus as claimed in claim 7, wherein the encryption key and the decryption key are stored in a given storage element whose accessibility is controlled by the interrupt controller circuitry, and the data protection circuitry is arranged to enable the processing circuitry to access the given storage element whilst the processing circuitry is executing the TEE interrupt service routine.

9. An apparatus as claimed in claim 8, wherein the given storage element is one of:
at least one register external to a processing unit containing the processing circuitry which the processing circuitry is only enabled to access when executing the TEE interrupt service routine;
at least one special function register within the processing unit that the processing circuitry is only enabled to access when executing the TEE interrupt service routine;
at least one general purpose register within the processing unit in which the processing unit is enabled, under control of the data protection circuitry, to maintain a copy of the encryption key and the decryption key whilst the processing circuitry is executing the TEE interrupt service routine.

10. An apparatus as claimed in claim 7, wherein early execution code executed by the processing circuitry following a reset of the apparatus is arranged to scrub memory in order to avoid access to the confidential data in unencrypted form in the event execution of the TEE interrupt service routine was interrupted at a time the apparatus was reset.

11. An apparatus as claimed in claim 1, further comprising:
    access control circuitry to which any access request seeking to access the confidential data must be routed before allowing the confidential data to be accessed; and
    the access control circuitry is controlled by the data protection circuitry to prevent access to the confidential data unless the processing circuitry is executing the TEE interrupt service routine.

12. An apparatus as claimed in claim 1, wherein memory accessible to the processing circuitry includes private memory, and the data protection circuitry is arranged to only enable the processing circuitry to access the private memory when the processing circuitry is executing the TEE interrupt service routine.

13. An apparatus as claimed in claim 12, further comprising:
    a plurality of bus arbiters used to arbitrate access to associated blocks of memory;
    in a default mode of operation, each bus arbiter whose associated block of memory is within the private memory is arranged to assert a fault signal if the processing circuitry seeks to access the associated block of memory; and
    the data protection circuitry is arranged to cause each bus arbiter whose associated block of memory is within the private memory to operate in a further mode of operation whilst the processing circuitry is executing the TEE interrupt service routine, in which each bus arbiter whose associated block of memory is within the private memory allows the processing circuitry to access the associated block of memory.

14. An apparatus as claimed in claim 13, wherein each bus arbiter whose associated block of memory is within the private memory is arranged to be located relative to the associated block of memory so as to inhibit provision of a bypass path that would enable the associated block of memory to be accessed without routing the access through the bus arbiter.

15. An apparatus as claimed in claim 13, further comprising:
    direct memory access circuitry which the processing circuitry can utilise to perform chosen memory accesses on behalf of the processing circuitry;
    wherein the data protection circuitry is arranged to cause use of the direct memory access circuitry to be disabled whilst the processing circuitry is executing the TEE interrupt service routine.

16. An apparatus as claimed in claim 12, wherein the data protection circuitry is arranged to control access to a private memory enable register so as to only enable access to the private memory enable register whilst the processing circuitry is executing the TEE interrupt service routine, and access to the private memory enable register causes the private memory to be made accessible to the processing circuitry.

17. An apparatus as claimed in claim 1, wherein memory accessible to the processing circuitry includes a memory slice that the data protection circuitry is arranged to only enable the processing circuitry to access when the processing circuitry is executing the TEE interrupt service routine.

18. An apparatus as claimed in claim 17, further comprising a memory slice defining storage element whose accessibility is controlled by the interrupt controller circuitry, and the data protection circuitry is arranged to enable the processing circuitry to access the memory slice defining storage element whilst the processing circuitry is executing the TEE interrupt service routine in order to enable the processing circuitry to access the memory slice.

19. An apparatus as claimed in claim 18, wherein the memory slice defining storage element is one of:
    a register external to a processing unit containing the processing circuitry which the processing circuitry is only enabled to access when executing the TEE interrupt service routine;
    a special function register within the processing unit that the processing circuitry is only enabled to access when executing the TEE interrupt service routine;
    a lockable configuration register that the processing circuitry is only enabled to access when executing the TEE interrupt service routine.

20. An apparatus as claimed in claim 18, wherein the memory slice defining storage element is arranged to identify a range of memory addresses forming the memory slice.

21. An apparatus as claimed in claim 18, further comprising access control circuitry used to control access to memory by the processing circuitry, and the data protection circuitry is arranged to control the access control circuitry to enable access to the memory slice by the processing circuitry when the processing circuitry is executing the TEE interrupt service routine.

22. A method of providing a trusted execution environment within an apparatus comprising:
    employing processing circuitry to execute program code; and
    arranging interrupt controller circuitry to be responsive to receipt of one or more interrupt requests to select a given interrupt request from amongst the one or more interrupt requests, and to issue an interrupt signal to the processing circuitry identifying a given interrupt service routine providing program code to be executed by the processing circuitry to service the given interrupt request;
    causing the interrupt controller circuitry, when the given interrupt request is a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry;
    providing the interrupt controller circuitry with code protection circuitry to inhibit unauthorised modification of the TEE interrupt service routine; and
    providing the interrupt controller circuitry with data protection circuitry to inhibit unauthorised access to confidential data processed by the TEE interrupt service routine.

23. A non-transitory computer-readable medium to store computer-readable code for fabrication of an apparatus comprising:
    processing circuitry to execute program code; and
    interrupt controller circuitry, responsive to receipt of one or more interrupt requests, to select a given interrupt request from amongst the one or more interrupt requests, and to issue an interrupt signal to the processing circuitry identifying a given interrupt service routine providing program code to be executed by the processing circuitry to service the given interrupt request;
    wherein:
    the interrupt controller circuitry is responsive to the given interrupt request being a trusted execution environment (TEE) interrupt request, to issue the interrupt signal to identify as the given interrupt service routine a TEE interrupt service routine, and to inhibit issuance of any further interrupt signal until the TEE interrupt service routine has been executed by the processing circuitry;

the interrupt controller circuitry comprises code protection circuitry to inhibit unauthorised modification of the TEE interrupt service routine; and the interrupt controller circuitry further comprises data protection circuitry to inhibit unauthorised access to confidential data processed by the TEE interrupt service routine.

* * * * *